US007996432B2

(12) United States Patent
Coffman et al.

(10) Patent No.: US 7,996,432 B2
(45) Date of Patent: *Aug. 9, 2011

(54) SYSTEMS, METHODS AND COMPUTER PROGRAM PRODUCTS FOR THE CREATION OF ANNOTATIONS FOR MEDIA CONTENT TO ENABLE THE SELECTIVE MANAGEMENT AND PLAYBACK OF MEDIA CONTENT

(75) Inventors: Daniel M. Coffman, Bethel, CT (US); Barry Leiba, Cortlandt Manor, NY (US); Chandrasekhar Narayanaswami, Wilton, CT (US); Marcel C. Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 12/037,023

(22) Filed: Feb. 25, 2008

(65) Prior Publication Data
US 2009/0216805 A1 Aug. 27, 2009

(51) Int. Cl.
*G06F 7/00* (2006.01)
*G06F 17/30* (2006.01)

(52) U.S. Cl. .................. 707/796; 707/804; 715/201

(58) Field of Classification Search .......... 707/600–831; 715/201, 205, 255, 738, 744; 709/248
See application file for complete search history.

(56) References Cited

U.S. PATENT DOCUMENTS

| 6,192,340 B1 | 2/2001 | Abecassis |
| 6,760,916 B2 | 7/2004 | Holtz et al. |
| 7,099,946 B2 * | 8/2006 | Lennon et al. ................ 709/227 |
| 7,234,104 B2 * | 6/2007 | Chang et al. .................. 715/202 |
| 7,596,234 B2 * | 9/2009 | Lu et al. ........................ 381/119 |
| 2002/0069218 A1 | 6/2002 | Sull et al. |
| 2002/0154157 A1 | 10/2002 | Sherr et al. |
| 2003/0018609 A1 | 1/2003 | Phillips et al. |
| 2003/0208469 A1 | 11/2003 | Stern |
| 2004/0078353 A1 | 4/2004 | Brock et al. |
| 2004/0255236 A1 | 12/2004 | Collart |
| 2005/0065912 A1 | 3/2005 | Cafrelli et al. |
| 2006/0161635 A1 | 7/2006 | Lamkin et al. |
| 2006/0248209 A1 | 11/2006 | Chiu et al. |
| 2006/0257053 A1 * | 11/2006 | Boudreau et al. ............. 382/305 |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2007/0027958 A1 | 2/2007 | Haslam |
| 2007/0077921 A1 | 4/2007 | Hayashi et al. |

(Continued)

OTHER PUBLICATIONS

Deng et al, Adaptive content model for multimedia presentation, 2002, IEEE, 8 pages.*

(Continued)

*Primary Examiner* — Jean B Fleurantin
(74) *Attorney, Agent, or Firm* — Cantor Colburn LLP; William J. Stock

(57) ABSTRACT

The exemplary embodiments of the present invention provide a method for generating an annotation for media content, that includes retrieving a media content subset from a media content source, saving the received media content subset at a computing system, and generating an annotation for association with the media content subset using the computing system. The method further includes associating the annotation with media content to facilitate the visualization and navigation of the media content and adding the annotation to at least one annotation repository designed for efficient retrieval of annotation elements.

17 Claims, 7 Drawing Sheets

U.S. PATENT DOCUMENTS

| | | |
|---|---|---|
| 2007/0078712 A1 | 4/2007 | Ott, IV et al. |
| 2007/0078713 A1 | 4/2007 | Ott, IV et al. |
| 2007/0078714 A1 | 4/2007 | Ott, IV et al. |
| 2007/0078884 A1 | 4/2007 | Ott, IV et al. |
| 2007/0083674 A1 | 4/2007 | Mulder et al. |
| 2007/0091206 A1 | 4/2007 | Bloebaum |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0110010 A1 | 5/2007 | Kotola et al. |
| 2007/0118425 A1 | 5/2007 | Yruski et al. |
| 2007/0118657 A1 | 5/2007 | Kreitzer et al. |
| 2007/0118853 A1 | 5/2007 | Kreitzer et al. |
| 2007/0130012 A1 | 6/2007 | Yruski et al. |
| 2007/0130158 A1 | 6/2007 | LaBiche et al. |
| 2007/0149183 A1 | 6/2007 | Dunko et al. |
| 2007/0150462 A1 | 6/2007 | Nonaka et al. |
| 2007/0150502 A1 | 6/2007 | Bloebaum et al. |
| 2007/0162443 A1 | 7/2007 | Liu et al. |
| 2007/0220278 A1* | 9/2007 | Nixon ........................ 713/193 |
| 2008/0005801 A1 | 1/2008 | Abdo et al. |

OTHER PUBLICATIONS

Daryl T Lawton et al, The Knowledge Weasel hypermedia annotation system, Dec. 1993, ACM, 106-117.*

Ferret: A Toolkit for Content-Based Similarity Search of Feature-Rich Data, [online]; [retrieved on Nov. 16, 2009]; All retrived from the Internet http://www.cs.princeton.edu/cass/papers/Ferret.pdf, All Pages.

Personal Sound Browser—A Collection of Tools to Search, Analyze and Collect Audio Files in a LAN and in the Internet (Abstract), [online]; [retrieved on Apr. 13, 2010]; retrieved from the Internet http://www.sigmap.icete.org/Abstracts/2006/abstracts.html, All Pages.

Turetken et al., 'Visualization of Web Spaces: State of the Art and Future Directions', The Data Base for Advances in Information Systems, vol. 38, No. 3, Aug. 2007, pp. 51-81.

Zhe Wang et al., "VFerret: content-based similarity search tool for continuous archived video,"; 2006, ACM, 19-26.

* cited by examiner

- ⊞ Annotated Files
  - ⊟ Mike Rhodin: Westford Town Halls (near-CD quality version) — 221A
    - Dan Coffman on at    341A
  - ⊟ Lawyers, Guns and Money — 221B
    - Dan Coffman on Oct 5, 2007 at 1:32:48 PM    351A
    - Dan Coffman on Jan 23, 2006 at 3:44:39 PM    351B
    - Dan Coffman on Jan 29, 2006 at 3:39:56 PM    351C
  - ⊟ Symphony No. 3, I. Old Folks Gatherin', Andante maestoso — 221C
    - George Smith on 26 Sep 2007 at 22:02:4;    361A
    - Dan Coffman on Sep 28, 2007 at 1:24:21 PM    361B
    - Dan Coffman on Oct 2, 2007 at 2:38:28 PM    361C

SYSTEMS, METHODS AND COMPUTER PROGRAM PRODUCTS FOR THE CREATION OF ANNOTATIONS FOR MEDIA CONTENT TO ENABLE THE SELECTIVE MANAGEMENT AND PLAYBACK OF MEDIA CONTENT

CROSS-REFERENCE TO RELATED APPLICATION

This application is related to co-pending U.S. patent applications entitled "SYSTEMS, METHODS AND COMPUTER PROGRAM PRODUCTS FOR GENERATING METADATA AND VISUALIZING MEDIA CONTENT", filed on Feb. 25, 2008, by Coffman et al., having and accorded Ser. No. 12/037,002, "SYSTEMS, METHODS AND COMPUTER PROGRAM PRODUCTS FOR INDEXING, SEARCHING AND VISUALIZING MEDIA CONTENT", filed on Feb. 25, 2008, by Coffman et al., having and accorded Ser. No. 12/037,005, "SYSTEMS, METHODS AND COMPUTER PROGRAM PRODUCTS FOR THE USE OF ANNOTATIONS FOR MEDIA CONTENT TO ENABLE THE SELECTIVE MANAGEMENT AND PLAYBACK OF MEDIA CONTENT", filed on Feb. 25, 2008, by Coffman et al., having and accorded Ser. No. 12/037,035, all of which are entirely incorporated herein by reference.

BACKGROUND OF THE INVENTION

1. Field of the Invention

The present invention generally relates to creation of related data for media content. Specifically, this application relates to the creation by human users of annotations to media content, and to their efficient visualization and distribution.

2. Description of Background

Media files, such as audio and video streams, are popular for the dissemination of information, for the purposes of entertainment, education and collaboration, among others. Generally, they are consumed by a user when they are played sequentially from beginning to end. There is no generally available mechanism for marking a particular section of the media file as being of interest, or of saving a description of this region of interest as new meta-information and sharing this with friends or colleagues.

In contrast, materials presented to users through traditional print media are usually accompanied by an index, chapter and section headings, and page numbers, or other meta-information that is implemented in order to help users navigate through these materials. In most instances, when a user consumes materials transmitted through traditional media, it is simple for the user to add information to the materials. The user may keep a journal with his or her comments. The contents of this journal may be easily shared with colleagues. In addition, in the case of a printed document, the user may create notes for their own convenient use by writing them in the margins.

SUMMARY OF THE INVENTION

Embodiments of the present invention provide a system, method, and computer program product for creating metadata and visualization data for media content.

An exemplary embodiment includes a method for method for generating an annotation for media content, that includes retrieving a media content subset from a media content source, saving the received media content subset at a computing system, and generating an annotation for association with the media content subset using the computing system. The method further includes associating the annotation with media content to facilitate the visualization and navigation of the media content and adding the annotation to at least one annotation repository designed for efficient retrieval of annotation elements.

Another exemplary embodiment includes a system for generating an annotation for media content. Briefly described, in architecture, one embodiment of the system, among others, can be implemented as follows. The system includes a retrieving module that receives a media content subset from a media content source, a saving module that saves the received media content subset on a computing system, and a generating module that generates an annotation for association with the media content subset using the computing system. The system further includes an associating module that associates the generated annotation with the media content to facilitate the visualization and navigation of the media content, and an adding module that adds the annotation to at least one metadata repository designed for efficient retrieval of the metadata elements.

A further exemplary embodiment includes a computer program product for generating an annotation for media content. The computer program product including a tangible storage medium readable by a computer system and storing instructions or execution by the computer system for performing a method. The method includes retrieving a media content subset from a media content source, saving the received media content subset at a computing system, and generating an annotation for association with the media content subset using the computing system. The method further includes associating the annotation with media content to facilitate the visualization and navigation of the media content and adding the annotation to at least one annotation repository designed for efficient retrieval of annotation elements.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 illustrates an exemplary screenshot detailing an exemplary visualization of a set of annotations that are associated with a plurality of media files in accordance with the exemplary embodiments of the present invention.

Figure 1:
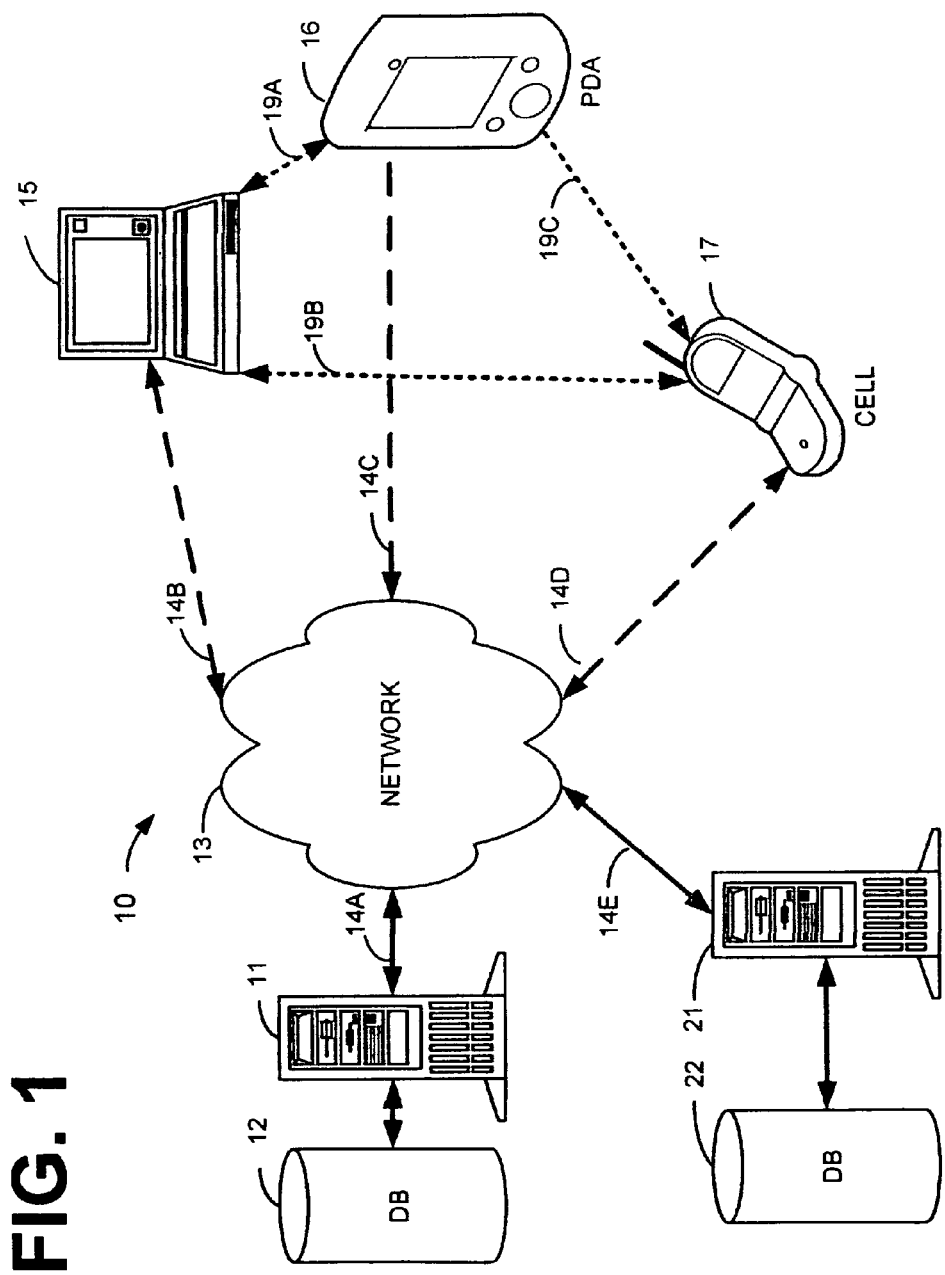
FIG. 1 is a block diagram of a system for generating annotations for media content in an exemplary embodiment.

The detailed description explains the exemplary embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

The shortcomings of the prior art are overcome and additional advantages are provided through the provision of a method for creating user generated annotation information for a media content file. The exemplary method comprises storing the index point and the annotation metadata that is associated with the index point in a database and displaying a graphic representation of a media file playback timeline for the at least one media file. The graphic representation of the media file playback timeline further comprising graphical annotations for index points and annotation metadata that are associated with time periods or regions-of-interest within a media file. Also, a visual representation of the annotation metadata is used to initiate the selective playback of the content of a media file or the annotation content information at the time period or region-of-interest that is associated with the annotation.

The exemplary embodiments of the present invention provide a mechanism by which the consumer of a media file can append of comments (i.e. annotations) (textual, audio, or audio/visual) to the media file. Thereafter, the media file and its associated annotations can be disseminated together within a network environment. Further, a modality is provided for alerting a media file user of the presence of such annotated comments. Within the exemplary aspects of the present invention this modality comprises static and active components. The static component displays information in regard to the available annotations, wherein the active component indicates the presence of an annotation relating to an identified section of the media file during playback of the media file.

Within the exemplary embodiments a media file user creates an annotation (a comment, or other remark of importance to the user) in reference to a specific portion of the media file. Further, an annotation is associated with and referenced at the media file through one or more index points, wherein index points serve as descriptors of the particular portion of the media file to which the annotation refers.

Functionally, annotations are considered to be logical extensions of a media file. As such, they may be stored within the content of the media file or they may be stored remotely from the media file, or employing a combination of both storage methods. In the instance that annotations are stored within the content of the media file, it is easy to share these annotations with colleagues. However, in the event that the number of annotations becomes large, as when the users of a media file create a large number of annotations for the file, it may be more practical to store them in a database external to the media file. The database may reside in the same physical location as the repository containing the media file, but it need not.

An annotation will have at least one associated index point, this index point being created by the user either during the initial recording of a media file or within a following time period. In both cases, an annotation creator will actuate an active control (e.g., a button situated at a media playback device a GUI control displayed at a computing system or remote computing device) in order to create an index point that references a particular time period within the playback of the media file content.

If media file user is consuming the media file at a time period after the initial recording of the media file, then they may manually select a region within the content of the media file of particular interest. If the user is playing the media file in a linear, sequential fashion, they may elect to create an annotation at any time during the playback. This effectively stops the playback of the media file and creates an index point at the section of the media file where playback was suspended. The user may then create a detailed annotation referring to the content of the media file at this point. In this manner, the index point so created delimits the beginning of a region-of-interest within the media content. If the user wishes, he or she may create another index point indicating the end of this region; in this manner, the pair of index points completely delimits the region-of-interest. Otherwise, an annotation will refer to the position in the media file represented by the initial (single) index point. Additionally, the media file may contain material of no predefined duration, such as a succession of images as in a business presentation. In this case, an annotation will frequently apply only to a single image, and so will have a region of interest demarked by only a single index point.

The user may not wish to play back the media file in its entirety. The user may consume only a portion of the content, and even replay a portion of it, before beginning to create an annotation. In this case, the user may be aided by a visualization of the media file, such as, but not limited to, a timeline. Within the exemplary embodiments any existing annotations may be visualized on this timeline in a predetermined graphic manner (e.g., such as, but not limited to, bars of a contrasting color). By selecting an existing annotation causes its visualization to appear. As such, the user may start playing the media file at the beginning of the region-of-interest for a particular annotation by activating the index point of its beginning. Within the exemplary embodiment, the user accomplishes this aspect by moving a graphical pointing device to the representation of the annotation and activating the device's selection mechanism (i.e., selecting or clicking on the graphical representation of the annotation). Having chosen an existing annotation in this manner, the user may wish to create a new annotation. In this case, the new annotation will refer to the existing annotation (i.e., a comment of a comment) and will inherit the region-of-interest of the media file from the existing annotation. The region-of-interest of this new annotation may be further refined to contain only a subset of that of the original annotation. At a later time, a user—the same user or someone else—may create a new annotation referring to this just created annotation. In this way, a cascade of annotations may all refer to the same region of interest of the media file.

The content of an annotation usually contains at least the identification of the user creating the annotation, this content information including but not limited to the user's name and organizational affiliation; the date and time of the creation of the annotation; a description of the media file to which it pertains; and the index points delimiting the beginning and end of the region of the media file of interest. In addition, annotation content information contains such information as is necessary for the proper interpretation of the annotation, including but not limited to the encoding scheme of any text in the annotation and the units by which times are measured. Further, the content of the annotation may include an importance factor or rating that is associated with the annotation. The importance factor can be a numeric value or be indicated by color, or a predetermined number (e.g., markers such as stars).

The content of the annotation may contain additional information of importance to the user. This supplemental information may comprise a plurality of forms (e.g., text, audio recording, an image, or a video clip). Within additional exemplary embodiments the annotation may include an advertisement, wherein the advertisement can be featured either by itself or in concert with other forms of supplemental information. In each case, the annotation contains any additional information necessary for the proper interpretation of the annotation.

The annotation may further include recipient lists or access control lists which indicate what parties may receive the annotations or have been granted access to the annotations. Traditional methods of authentication, such as passwords, single sign-on, or tokens and tags, can be used to verify the granted access rights of users before allowing access to controlled annotations. The access control list can also be used to deliver annotations to users who may have already downloaded the media content prior to the creation of later made annotations. Users may specify through subscription mechanisms if they want to receive annotations that have been made after they have downloaded a particular piece of media content.

The annotations associated with a particular media file are visualized for the convenience of the user. In the exemplary embodiment, the annotations are shown in a hierarchical fashion, ordered by the position of the starting index point of the region of interest of the annotation. In the case of an annotation created in the manner described above, the case of an annotation referring to another annotation, the second annotation is placed just below the first, indented slightly. Any annotations referring to this second annotation are placed below it, indented by a further amount. In this manner, the cascading nature of the hierarchy of the annotations will become clear to the user. This visualization can be customized explicitly through the use of user-defined filters, or implicitly through the use of access control mechanisms.

The presentation of a particular annotation within the visualization depends on its content. In the exemplary embodiment, annotations with differing content, say text and audio recordings, are represented by different icons, or other visual elements. In a similar manner, a newly recorded annotation is represented in a contrasting color to distinguish it from annotations recorded earlier, possibly by different users. Within the exemplary embodiments a key or a visual index is provided in order to interpret the meaning of the colors and icons.

A user may wish, after reviewing an annotation, to delete it. In the exemplary embodiment, this is accomplished through the use of visual controls. The annotation may be either deleted immediately and irrevocably, or merely marked for later deletion. In the latter case, it is presented visually in a contrasting color or with a text style such as strikethrough. Further, at any time, the user may wish to save the annotations he or she has created or permanently remove those marked for deletion. The annotations thus modified may be incorporated within the media file, or may reside in an external repository.

Such a repository may be located on the user's computing device, or remotely on another computing device.

When incorporated within a media file, the annotations will be available, indeed visible, only to users with a specially adapted player. The media file will be playable on an unmodified player, but the annotations will not. Also, in the instance that the user desires to share their annotations with friends and colleagues, if the annotations are stored on an external repository, the user may simply inform these colleagues of the presence of these annotations and of the media file to which they refer. Such a notification will usually occur through the provision of a Universal Resource Identifier (URI). However, for the convenience of the recipient of such a notification the annotations can be incorporated into a copy of the media file, thus providing the recipient with a single file to manipulate. Thus, the user may prepare such a copy on their own computing device and transmit the location of this copy (or the copy itself) to the intended recipients.

This distribution process may be refined if the media file so prepared, with its annotations contained within is cropped so that it only contains the regions of interest referred to by the several annotations. This is particularly important in the instance that the media file is large, as is frequently the case. In this instance, the media file so abbreviated is provided with a descriptor indicating the location of the unedited media file. Given this information, the ultimate recipient of the file may obtain a copy of the complete media file, if desired.

The form of an annotation may be modified if the user so desires. In particular, the content of a text annotation may be transformed into an audible form through the use of a text-to-speech engine. Similarly, the content of an audible annotation may be transformed into legible text through the use of an automatic speech recognition engine. In either of these cases, this transformation could occur before the annotation is saved by the user, or could be performed by another user after having received the media file and its annotations from the original user.

After the several annotations created by the user have been saved, they may be used as the basis for a search procedure. Such search procedure protocols may include a search for the elements contained in any annotation (e.g., such as the author, date and time of creation, or descriptor of the media file to which it refers). Further, if the annotation's content is of a textual nature, or has been transformed as described above into a textual form, the contents of the annotation may be included in the search. Thus, for example, a user may request all media files in a repository annotated by a particular person, or a specific media file for which an annotator had made a particular comment.

The presence of an annotation may be signaled during playback of the media file. In the exemplary embodiment, this signaling is triggered when playback reaches the beginning of the region of interest of a particular annotation. This signal may be a special audible tone, or in the case of a textual annotation, the content of this text itself. Tactile means, such as non-obtrusive vibration patterns, may also be used for this purpose. Regardless of the signaling mechanism, the user may or may not elect to receive such notification. Having received the notification, the user may suspend playback of the media file, examine the relevant annotation or annotations, and subsequently resume playback of the media file.

Annotations may be presented automatically during playback of the media file. In this case, the playback would be interrupted, the annotation presented, and the playback resumed. The presentation of the annotation would be in a manner appropriate to its contents. For example, if the content is textual content, then the text content would be displayed; f the content is audible content, then the audio content would be played back; and if the content is visual content, then the content would be presented visually. In each case, the user would configure when such annotations should be presented. In the exemplary embodiment, the user can indicate a playback threshold number above which the annotations would not be played. Further, the presence of the playback threshold would be indicated in accordance with the playback and triggering mechanism as described above. Similarly, the user can specify that they only want to be presented with annotations only from a particular group or a groups of authors.

Within the exemplary embodiment of the present invention a media repository is provided for the storage of media content. The media repository can be housed on one or more servers to allow many users to access the content. Users may download portions of the media library to portable devices (e.g., such as laptop computers, game consoles, PDAs, or cellular phones, etc.). Users may also download media content to non-portable devices (e.g., such as desktop computers, set-top boxes, and personal juke-boxes). Users may consume the media from the device to which the content was downloaded.

Users may further subscribe to topics of interest and have pertinent media content automatically delivered to devices of choice. Parameters for subscription can include authors or media, date ranges, length or rating of content, number of times content has been downloaded, number of annotations, authors of annotations, etc. Within further exemplary embodiments, the media may be streamed to the device on which the media is consumed without first making a replica of the media content on the device. In this instance the user can annotate media content during the process of media consumption as explained in detail above. Further, these annotations can be reserved for usage strictly by the annotation author on the author's playback device of choice. Annotations that are intended for upload back on the server will be retrieved when the device on which the media is consumed and the media repository reconnected. The annotations may alternatively be uploaded to a server or repository that is different from the repository from which the media was downloaded. This will facilitate a private collection of annotations that may be shared with subsets of people (e.g., such as within a family, within a department in an enterprise, a collection of enterprises, etc.).

Referring now to the drawings, in which like numerals illustrate like elements throughout the several views, FIG. 1 illustrates an example of the basic components of a system 10 using the annotation system used in connection with the preferred embodiment of the present invention. The system 10 includes a server 11 and the remote devices 15, 16, 17 or 21 that utilize the annotation system of the present invention.

Each remote device 15-17 and 21 has applications and can have a local database 22. Server 11 contains applications, and a database 12 that can be accessed by remote device 15-17 and 21 via connections 14(A-E), respectively, over network 13. The server 11 runs administrative software for a computer network and controls access to itself and database 12. The remote device 15-17 and 21 may access the database 12 over a network 13, such as but not limited to: the Internet, a local area network (LAN), a wide area network (WAN), via a telephone line using a modem (POTS), Bluetooth, WiFi, cellular, optical, satellite, RF, Ethernet, magnetic induction, coax, RS-485, the like or other like networks. The server 11 may also be connected to the local area network (LAN) within an organization.

The remote device 15-17 may each be located at remote sites. Remote device 15-17 and 21 include but are not limited to, PCs, workstations, laptops, handheld computer, pocket PCs, PDAs, pagers, WAP devices, non-WAP devices, cell phones, palm devices, printing devices and the like.

Thus, when a user at one of the remote devices 15-17 desires to access the metadata from the database 12 on the server 11, the remote device 15-17 communicate over the network 13, to access the server 11 and database 12.

Remote device 21 may be a third party computer system 21 and database 22 that can be accessed by the annotation system server 11 in order to obtain information for dissemination to the remote devices 15-17. Data that is obtained from third party computer system 21 and database 22 can be stored on the annotation system server 11 in order to provide later access to the user remote devices 15-17. It is also contemplated that for certain types of data that the remote user devices 15-17 can access the third party data directly using the network 13. It is also contemplated in an alternative embodiment, that computer system 21 and database 22 to be accessed by remote user devices 15-17 through server II which acts a conduit.

Figure 2:
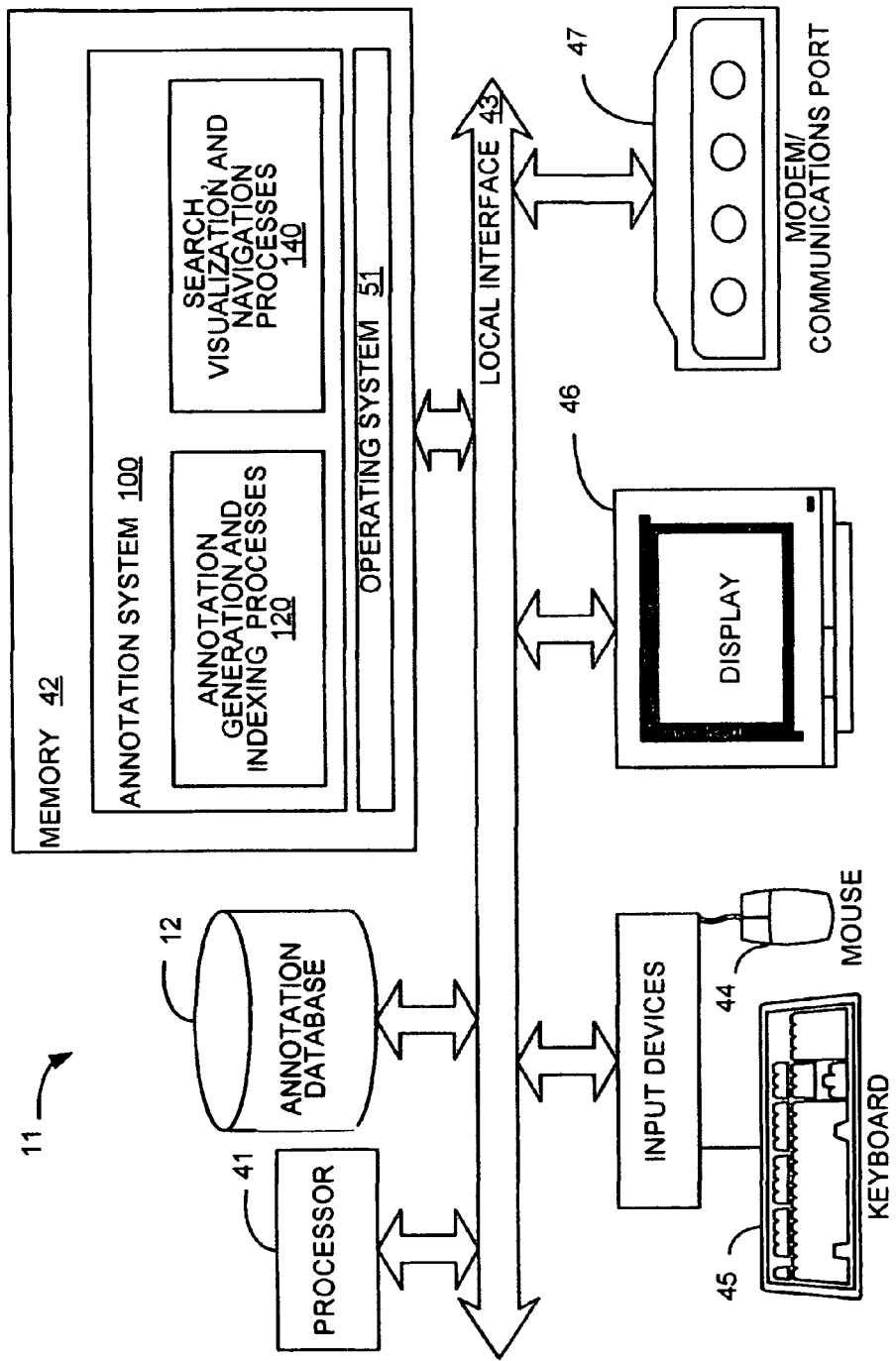
FIG. 2 is a block diagram illustrating an example of a computer utilizing the annotations system of the exemplary embodiment, as shown in FIG. 1

Illustrated in FIG. 2 is a block diagram demonstrating an example of server 11, utilizing the annotation system 100 of the exemplary embodiment, as shown in FIG. 1. Server 11 includes, but is not limited to, PCs, workstations, laptops, PDAs, palm devices and the like. The processing components of the remote devices 15-17 and 21 are similar to that of the description for the server 11 (FIG. 2). As illustrated, the remote device 15-17 and 21 includes many of the same components as server 11 described with regard to FIG. 2, and therefore will not be described in detail for the sake of brevity. Hereinafter, the remote devices 15-17 and 21 are devices that will be referred to as remote devices 15.

Generally, in terms of hardware architecture, as shown in FIG. 2, the server 11 include a processor 41, memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A. or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the annotation system 100 of the present invention. As illustrated, the annotation system 100 of the present invention comprises numerous functional components including, but not limited to, the annotation generation and indexing processes 120, and search visualization and navigation processes 140.

A non-exhaustive list of examples of suitable commercially available operating systems 51 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 51 essentially controls the execution of other computer programs, such as the annotation system 100, and provides scheduling, input-output control, file and data management, memory management, and communication control and related services. However, it is contemplated by the inventors that the annotation system 100 of the present invention is applicable on all other commercially available operating systems.

The annotation system 100 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 51. Furthermore, the annotation system 100 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server II is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 are in operation, the processor 41 is configured to execute software stored within the memory 42, to communicate data to and from the memory 42, and to generally control operations of the server 11 are pursuant to the software. The annotation system 100 and the O/S 51 are read, in whole or in part, by the processor 41, perhaps buffered within the processor 41, and then executed.

When the annotation system 100 is implemented in software, as is shown in FIG. 2, it should be noted that the annotation system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method.

The annotation system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In an alternative embodiment, where the annotation system 100 is implemented in hardware, the annotation system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
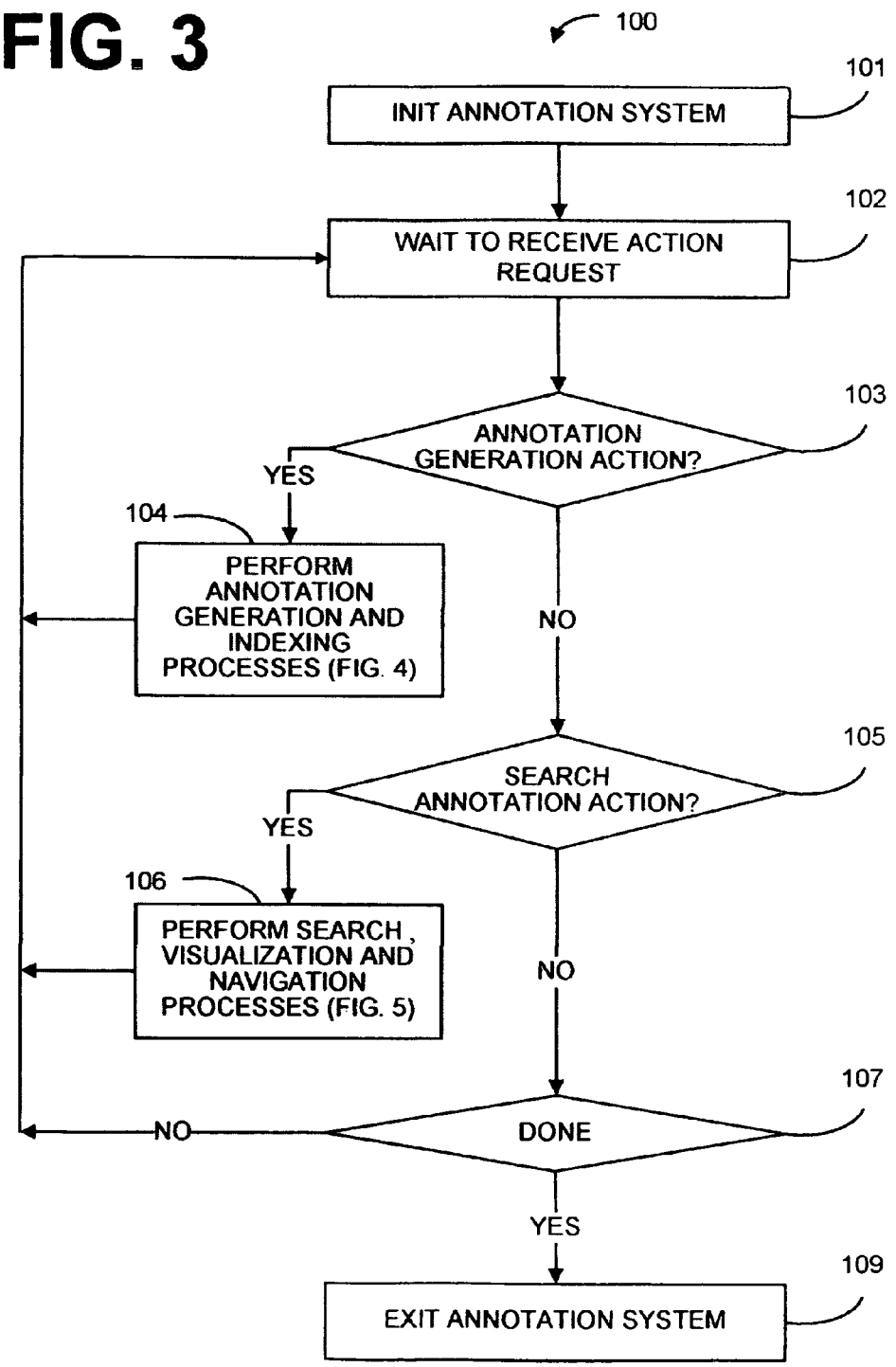
FIG. 3 is a flow chart illustrating the operation of an exemplary embodiment of the annotations system in the computer according to the principles of the present invention, as shown in FIGS. 1 and 2.

FIG. 3 is a flow chart illustrating the operation of an exemplary embodiment of the annotation system 100 in a computer according to the principles of the present invention, as shown in FIGS. 1 and 2. The annotation system 100 of the present invention provides instructions and data in order to enable a user on a remote device to create related data (i.e. annotations and metadata) for media content.

First at step 101, the annotation system 100 is initialized. This initialization includes the startup routines and processes embedded in the BIOS of the server 11. The initialization also includes the establishment of data values for particular data structures utilized in the annotation system 100.

At step 102, the annotation system 100 waits to receive an action request. After receiving an action request, the annotation system 100 determines what type of action is being requested. At step 103, the annotation system 100 determines if an annotation generation action has been requested. An annotation generation action is one where the user on a remote device 15 submits a request for annotation generation on server 11. If it is determined at step 103 that the annotation generation action has not been requested, then the annotation system 100 proceeds to step 105. However, if it is determined at step 103 that an annotation generation action has been requested, then the annotation generation and indexing processes are performed at step 104. The annotation generation and indexing processes are herein defined in further detail with regard FIG. 4.

At step 105, the annotation system 100 determines if annotation search action has been requested. An annotation search action is one where media and any attached annotations are queried on database 12 or on a third parties database 22. If it is determined at step 105 that an annotation search action has not been requested, then the annotation system 100 proceeds to step 107. However, if it is determined at step 105 that an annotation search action has been requested, then the annotation search visualization and navigation processes are performed at step 106. The annotation search visualization and navigation processes are herein defined in further detail with regard FIG. 5.

At step 107, it is determined if the annotation system 100 is to wait for additional action request. If it is determined at step 107 that the annotation system is to wait to receive additional actions, then the annotation system 100 returns to repeat steps 102 through 107. However, if it is determined at step 107 that there are no more actions to be received, then the annotation system 100 then exits at step 109.

Figure 4:
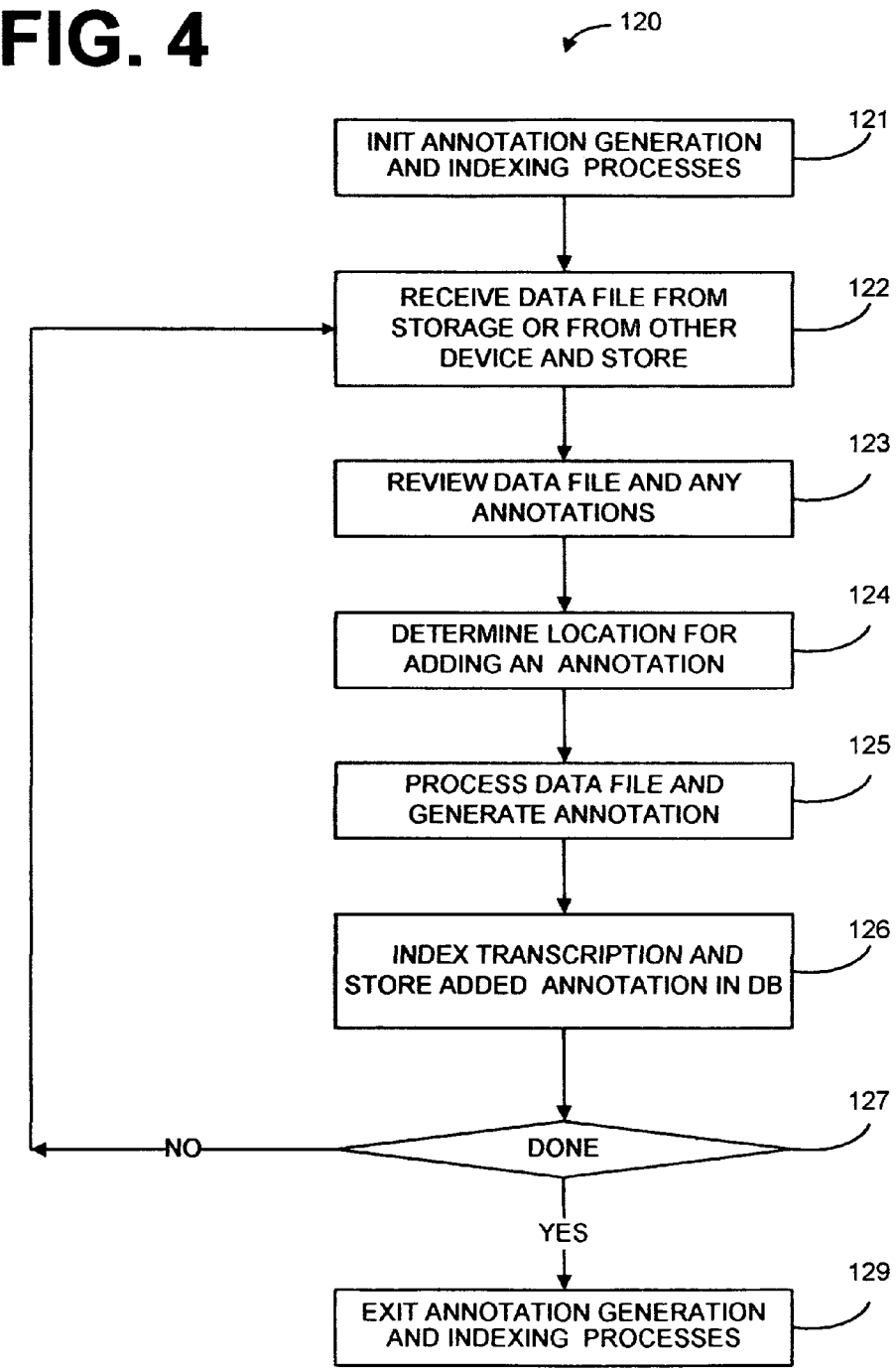
FIG. 4 is a flow chart illustrating the operation of an exemplary embodiment of the annotations generation and indexing processes in the computer according to the principles of the present invention, as shown in FIGS. 2 and 3.

FIG. 4 is a flow chart illustrating the operation of an exemplary embodiment of the metadata generation and indexing processes 120 in the computer according to the principles of the present invention, as shown in FIGS. 2 and 3. In the annotation generation and indexing processes 120, a media file user creates an annotation (a comment, or other remark of importance to the user) in reference to a specific portion of the media file. Further, an annotation is associated with and referenced at the media file through one or more index points, wherein index points serve as descriptors of the particular portion of the media file to which the annotation refers.

First at step 121, the annotation generation and indexing processes 120 is initialized. This initialization includes the startup routines and processes embedded in the BIOS of the server 11. The initialization also includes the establishment of data values for particular data structures utilized in the annotation generation and indexing processes 120.

At step 122, the annotation generation and indexing processes 120 receives a digital data file from storage or from another device. After receiving a digital file, annotation generation and indexing processes 120 then stores the digital data file to memory. The memories utilized can be memory 42 or annotation database 12 (FIG. 1).

At step 123, the annotation generation and indexing processes 120 enables a user to review a media file (i.e. data file) and any related in annotations for that data file. At step 124, the annotation generation and indexing processes 120 enables a user to determine a location for adding an annotation. An annotation will have at least one associated index point, this index point being created by the user either during the initial recording of a media file or within a following time period. In both cases, an annotation creator will actuate an active control (e.g., a button situated at a media playback device a GUI control displayed at a computing system or remote computing device) in order to create an index point that references a particular time period within the playback of the media file content. In addition, the identity of the annotator is included in the annotation.

At step 125, the annotation generation and indexing processes 120 process the media file and generate annotation and additional data pertaining to the annotation. Additional data includes but is not limited to the location of the media recording event, the time of the media recording, etc, can also be captured. The annotation generation and indexing processes 120 creates index points for data elements comprised within the media file content. The annotation generation and indexing processes 120 also comprises associating annotation with each created index point that is associated with the media file content. Index points are added within the media content of a media file in order to enable the enhanced presentation of search results and playback of the digital media file. An index point serves as an association between a discrete section of media and the annotation that is related to content of a media file. As used herein, an index point is defined as including the annotation and the information that is needed to identify the associated section of the media file. Index points for media content are logically part of the media content.

At step 126, the annotation generation and indexing processes 120 stores the index points and the annotation that is associated with the index points. Index points and the metadata may be physically stored with their associated media content at a media content repository or they may be stored elsewhere; or a combination of the two storage choices may be implemented. The storage of index points with the media content makes it easy to transfer the index points with the content; while the storage of index points (e.g., within an indexed database) makes the index points easier to search. An indexed database can either be stored remotely in DB 12 or locally in database 22 with the media content repository. Such configurations allow for rapid updates to be performed to the database index as media content is added to or deleted from the media content repository.

The media content repository and index database can be further replicated for purposes of high availability and efficient access to the media content and index points within a distributed environment. The media content in the repository can be delivered to a user as files, streams, or interactive objects.

At step 127, it is determined if the metadata generation and indexing processes 120 is to wait for additional action requests. If it is determined at step 125 that the annotation generation and indexing processes 120 is to wait to receive additional actions, then annotation generation and indexing processes 120 returns to repeat steps 122 through 127. However, if it is determined at step 127 that there are no more actions to be received, then annotation generation and indexing processes 120 then exits at step 129.

Figure 5:
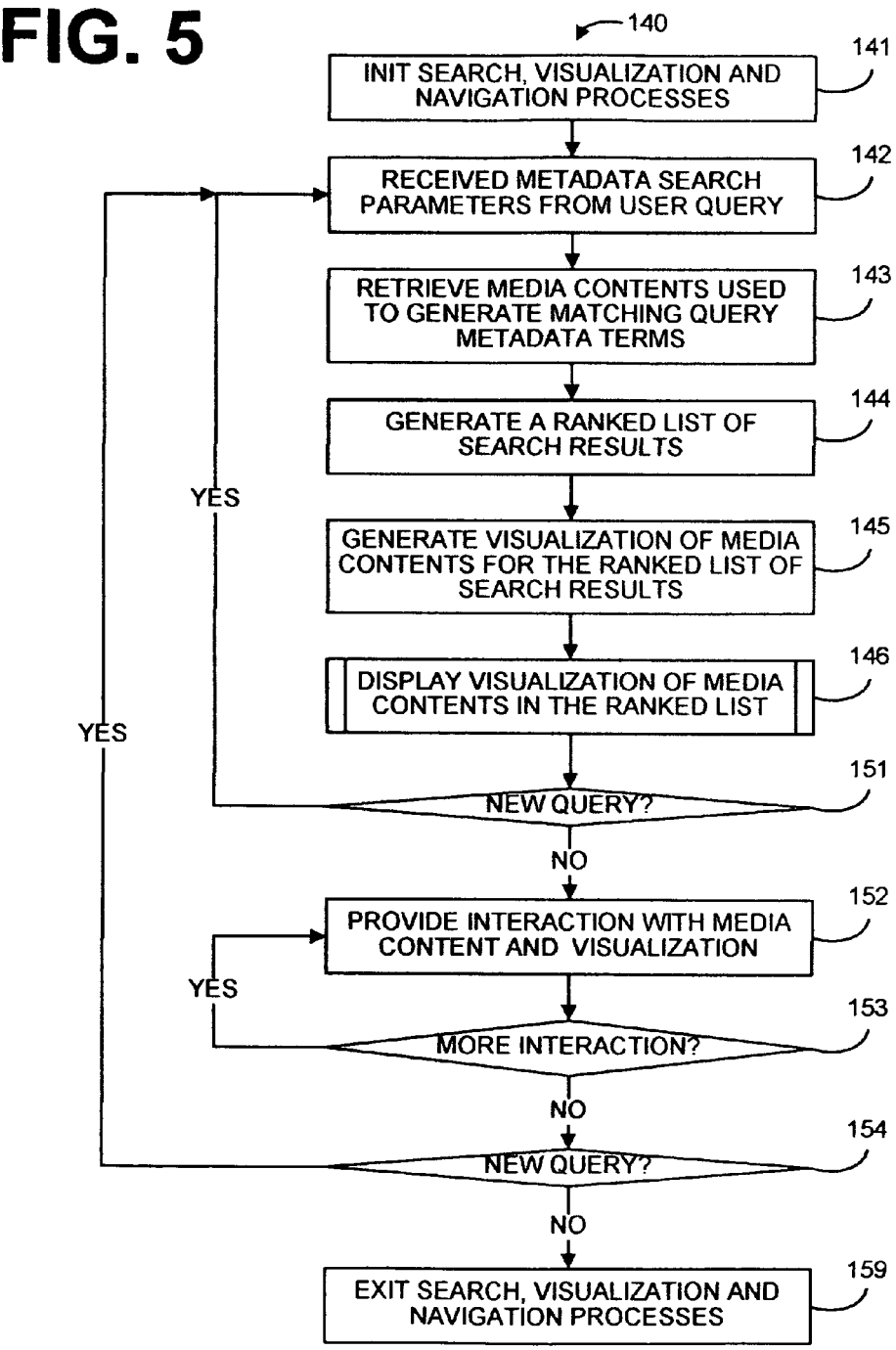
FIG. 5 is a flow chart illustrating the operation of an exemplary embodiment of the search visualization and navigation processes in the computer according to the principles of the present invention, as shown in FIGS. 2 and 3.

FIG. 5 is a flow chart illustrating the operation of an exemplary embodiment of the search, visualization and navigation processes 140 in the computer according to the principles of the present invention, as shown in FIGS. 2 and 3. A user is provided with the capability to search for media content, annotations or segments within the media content, through the use of a plethora of search criteria. The results of the user's search can then be visually displayed to the user, thus allowing the user to browse the structure of media content that satisfies their search criteria. The media content searches are enabled through the use annotations and metadata that was added to the media content after an analysis is performed upon the media content.

Once a list of matching media content is located, the matching media content is presented visually to the user, wherein thereafter the user can select and playback subsections of the media content the user wants to consume. The annotations and metadata associated with media content can include a wide variety of associative information parameters, including but not limited to the author or group of authors of a media file, location and time the media file was created, a time-stamped invitation associated with the audio track of a media file, the presence or absence of individuals within an audience at the recording of a media file, the media device used for capturing or recording media file content, the quality and format of media recording, access control listings.

First at step 141, the search, visualization and navigation processes 140 is initialized. This initialization includes the startup routines and processes embedded in the BIOS of the server 11. The initialization also includes the establishment of data values for particular data structures utilized in the search, visualization and navigation processes 140.

At step 142, the search, visualization and navigation processes 140 receive metadata or annotation search parameters from a user's query. Searches within the exemplary embodiments can include query words and phrases. For example, a query can be phrased and be specified along the lines of: Find me all occurrences of the word 'innovation' within this media content. Another search could specify: Find all media elements in the repository that include the word 'innovation'. More complex searches could search for occurrences of phrases and combinations of phrases that can be constructed with standard Boolean algebra. A search that includes a time criteria could specify: Find all media elements in the repository that include the word 'innovation' in the first two minutes of the media element.

Another variation would state: find sections of the media content where the word 'innovation' occurs within a time interval (e.g., 10 seconds) from the word research. The time interval can be specified through the query. The time interval concept can be applied to combinations of terms as well. For example, a query could state: Find a section where 'innovation' was mentioned but research was NOT mentioned within 30 seconds from when 'innovation' was mentioned. In the instance that the index point's database is relational, searches are implemented as SQL queries or as custom programs that use at least one SQL query.

At step 143, the search, visualization and navigation processes 140 retrieve the media content used to generate the matching query metadata terms. At step 144, the search, visualization and navigation processes 140 generate a ranked list of search results. This rank list of search results could be formatted in a number of different ways. One way would be to rank the list of search results by a score value. The score value would evaluate the number of hits of a search term within the particular search result. Other ways to rank the list of search results include, but are not limited to the duration of the media content, the type of search results, the file format of the search results and the like.

At step 145, the search, visualization and navigation processes 140 generate the visualization of media contents for the ranked list of search results. The visualization of the media content in the ranked list is then displayed at step 146. An exemplary screenshot of a representation of the results of a user search presented within a timeline representative of the media content is herein defined in further detail with regard FIG. 6.

At step 151, the search, visualization and navigation processes 140 determines if the user has indicated the initiation of a new query. If it is determined at step 151 that the user has initiated a new query, then the search, visualization and navigation processes 140 returns to repeat steps 142 through 151. However, if it is determined at step 151 that the user has not initiated a new query, then the search, visualization and navigation processes 140 provides for user interaction with the media content and visualization at step 152. At step 153, the search, visualization and navigation processes 140 determines if the user has indicated the repeated interaction with the media content and visualization. If it is determined at step 153 that the user has initiated repeated interaction, then the search, visualization and navigation processes 140 returns to repeat steps 152 through 153.

However, if it is determined at step 153 that the user has not initiated repeated interaction, then the search, visualization and navigation processes 140 determines if the user has indicated the initiation of a new query. If it is determined at step 154 that the user has initiated a new query, then the search, visualization and navigation processes 140 returns to repeat steps 142 through 151. However, if it is determined at step 154 that the user has not initiated a new query, then the search, visualization and navigation processes 140 then exits at step 159.

Figure 6:
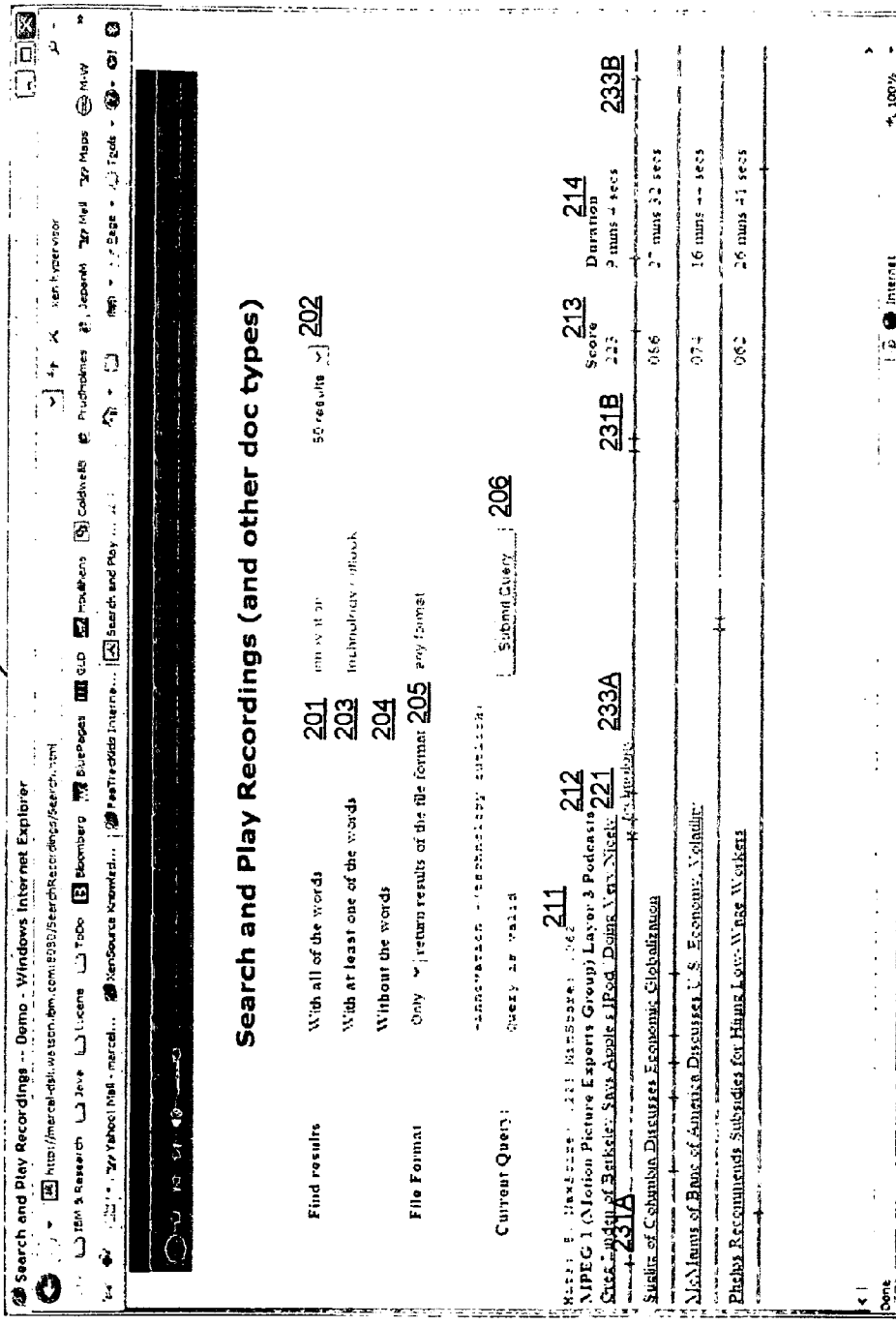
FIG. 6 illustrates an exemplary screenshot of a representation of the results of a user search presented within a timeline representative of the media content, wherein the timeline is annotated with index points.

FIG. 6 illustrates an exemplary screenshot 200 of a representation of the results of a user search presented within a timeline representative of the media content, wherein the timeline is annotated with index points. Query summary results 211 may be provided to indicate the number of search results and the weighted value of the query results. The query results also may contain an indication of the media content type 212. An item in the ranked list of the search results may comprise media title 221 weighted score 213 and duration 214 of the analyzed media.

Index points 231 & 233 that have a simple visualization, such as a word and its position, are presented partially or fully. Index points that require more complex visualization (i.e., using sets or hierarchies) are initially presented in a compact way wherein a means is provided for the user to expand the structure of the displayed index point visualization. The user can select any index point within the timeline and use the index point to play back just a particular segment of interest within the media content without having to playback the content from the beginning (and without having to aimlessly fast-forward through the content without real guidance).

To assist with navigation and selective playback of media file content, the displayed timeline can be zoomed and panned to provide flexibility for the user. Each individual timeline shown can be zoomed and panned independently. As the user zooms in on the timeline more details within the timeline may be revealed. At coarser resolutions the index points and associated metadata may be aggregated to make the visualization meaningful. For example, if the word 'innovation' appears one hundred times in a time interval corresponding to a small part of the visual timeline it will not be possible to annotate this portion of the timeline with a hundred markers. In such a case a bar over the interval or a single annotation 231 may quantify the number of occurrences of the word 'innovation' that occurred in that time interval.

As the user zooms in, more details of the timeline will be shown. The user may further interact with graphical markers for index points by one of more methods such as for example, but not limited to, touching, tapping, activating, or mousing over the graphical marker. Such interaction can reveal additional metadata—such as for example, but not limited to, the word as indicated by 233A, the name of the speaker who said the word 'technology' or the exact time at which the word was uttered. The user may then select one or a group of index points within the media content for batched playback.

Conventional technologies can be employed the timeline zooming and panning operations. For example, the panning may be accomplished by allowing the user to drag the timeline to the left or right for example with a mouse or a touch stroke. Zooming may be accomplished by selecting two points on the timeline and dragging one of the points. Alternatively auxiliary controls such as visual elements or a mouse wheel and pinching gestures on touch screens. The above methods are exemplary and one of ordinary skill in the art will realize other mechanisms can be used for zooming and panning.

Within the exemplary embodiments of the present invention index points can also be created for a media file through the coordination of information in regard to a presentation (e.g., such as a slide presentation) that is associated with a media content. In this case, the index points are utilized to represent slide changes or the triggering of slide animations. For example, the user may wish to skip a series of introductory slides and remarks and jump directly to a particular slide in a visual presentation in addition to listening to an audio portion corresponding to a slide while viewing the slide. These index points can be created by collecting additional data during the recording of the presentation (e.g., such as the start and end times of the presentation when each slide is viewed). Such data may include when the page-up and page-down keys were pressed to initiate the change of slides. Additionally, in the event that a slide was shown several times during the presentation, each set of start and end times are recorded. A structured view of the media in this case can show a histogram of the time spent on the slides and give a viewer a quick indication of the important slides. Using these techniques a viewer can grasp the important aspects of the presentation in less time than it takes to sequentially watch the presentation from start to end.

Another way to create index points is by identifying and associating speaker identification information with the media file content. In this instance, the index points will occur in the instance that the speakers as recorded on the media file changes during a recording event. This technique is useful in a teleconference or a meeting when there are several participants. Several technologies can be used to identify when a speaker changes (e.g., voice-printing schemes (which are analogous to finger prints) that use spectral analysis of the speech signal to identify speakers). This technique is especially useful when the speakers are in the same physical location. Higher success may be obtained in such settings by using an array of microphones to record the conversation. Another method to identify a speaker when the speaker is communicating over a phone or a media channel from another location is to tag the content with source information such as network address or port or telephone numbers and then associate parts of the media originating from that person with a suitable identifier. The network address or phone number can be further looked up in registered auxiliary databases to determine the identity of the speaker. The start and stop times for each speaker will be recorded each time she speaks.

Once such metadata has been recorded, a structured view of the media file can be displayed to show how many times a particular individual spoke and for how long an individual spoke. Histograms can be displayed to show the total time for which each speaker spoke. Using such structured views the user can listen to all the segments within the media file where a particular individual say spoke. Such rendering and consumption of content is quite different from the way audio and video are consumed today. The user may also listen only to the speaker who spoke for most of the time, or may choose to ignore that speaker. Once such information is recorded, the search interface can be extended to search for portions of media (e.g., instances where the word "innovation" was spoken by a particular individual).

It should be noted that different categories of index points can be searched in a combined query in a general fashion. For example if the location where the media file was recorded is part of the metadata information then a search query could take the form of: When did person X speak word Y while he was in location Z. If additional metadata is provided that records who was present when the media file was recorded, a more complex query would take the form: When did person X speak word Y while he was in location Z and persons J and K were in the audience. The physical presence of individual audience members can be detected by having the participants wear smart tags or tags on users' devices (e.g., such as badges and cell phones that utilize Bluetooth connections or teleconference data that maintains lists of connected participants, etc.).

In addition to being simple scalar elements, each index point may also serve as a set/vector or a hierarchical element, therefore adding a rich, flexible means of annotation to the media file content. A single point in a content might, for instance, be associated with a set of metadata, such as time, speaker, phrase, and location. As index points can be associated with the entire media content, searching the index point database can be used to retrieve from a media repository a collection of media content that satisfies some criteria. This is particularly useful for index points representing search terms, tags, comments, and speaker identification, allowing a media content repository to be searched for specific index points. For example a user might be interested in retrieving all the media that was downloaded by user X. Another user might be interested in locating all media files that were created in July by person K.

The index points can also be used to extract media segments of the content repository. For example portions of the media content spoken by person X can be concatenated to produce new, dynamically created content that can be delivered as a separate file or as a media stream. They can be used to control playback of the media content in a more efficient way.

FIG. 7 illustrates an exemplary screenshot detailing an exemplary visualization of a set of annotations that are associated with a plurality of media files in accordance with the exemplary embodiments of the present invention. A media file (i.e. item) in the ranked list of the search results may comprise media title 221 weighted score 213 and duration 214 of the analyzed media. If a user selects the associated annotations 300 are displayed. As shown, item 122A has associated annotations 341A, item 221B has associated annotations 351 A-C, and item 221C has associated annotations 361 A-C. By selecting an associated annotation, a user can display the full annotation and related data. In an alternative embodiment, by selecting an imitation starts the execution of the media file at the point associated with the start of the annotation.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for generating an annotation for media content, the method comprising:
   retrieving a media content subset from a media content source;
   saving the received media content subset at a computing system;
   generating an annotation for association with the media content subset using the computing system;
   associating the annotation with media content to facilitate the visualization and navigation of the media content, the annotation providing a graphical representation directing a user to a region of interest in the media content thereby visually presenting the location of associative information parameters of the media content enabling visual navigation of the media content; and
   adding the annotation to at least one annotation database for retrieval of annotation elements,
   wherein the content of the annotation contains an index point delimiting the beginning of the region of interest within the media file.

2. The method in claim 1, wherein the processing of the media content received by the computing system involves at least one remote computing system accessible to the computing system.

3. The method in claim 1, wherein the at least one annotation repository is stored on the computing system.

4. The method in claim 1, wherein the at least one annotation repository is stored on at least one remote computing system.

5. The method of claim 1, wherein the associating the annotation is with a particular time instance in the media file.

6. The method of claim 1, further comprising sharing the annotation with another user.

7. The method of claim 6, wherein the content of the annotation contains user-defined information.

8. A system for generating an annotation for media content, comprising:
   a device for sending a request to generate the annotation; and
   a processor for receiving the request, wherein the processor performs a method comprising:
   retrieving a media content subset from a media content source;
   saving the received media content subset on a computing system;
   generating an annotation for association with the media content subset using the computing system;
   associating the generated annotation with the media content to facilitate the visualization and navigation of the media content, the annotation providing a graphical representation directing a user to a region of interest in the media content thereby visually presenting the locations of associative information parameters of the media content enabling visual navigation of the media content, and
   adding the annotation to at least one annotation database for retrieval of annotation elements,
   wherein the content of the annotation contains an index point delimiting the ending of the region of interest within the media file.

9. The system of claim 8, wherein the content of the annotation contains user-defined information.

10. The system of claim 8, wherein the associating the annotation is with a particular time instance in the media file.

11. The system of claim 8, wherein the at least one annotation database is stored on at least one remote processor.

12. The system of claim 8, wherein the at least one annotation database is stored on the processor.

13. The system of claim 8, wherein the content of the annotation contains an index point delimiting the beginning of the region of interest within the media file.

14. The system of claim 8, wherein the annotation is shared with another user.

15. A computer program product for generating an annotation for media content, the computer program product comprising:
   a tangible storage medium readable by a computer system and storing instructions or execution by the computer system for performing a method comprising:
   retrieving a media content subset from a media content source;
   saving the received media content subset at a computing system;
   generating an annotation for association with the media content subset using the computing system;
   associating the annotation with media content to facilitate the visualization and navigation of the media content, the annotation providing a visual marker directing a user to a region of interest in the media content thereby visually presenting the locations of associative information parameters of the media content enabling visual navigation of the media content; and
   adding the annotation to at least one annotation database for retrieval of annotation elements,
   wherein the content of the annotation contains a first index point delimiting the beginning of the region of interest within the media file, and a second index point delimiting the ending of the region of interest within the media file.

16. The computer program product of claim 15, wherein the processing of the media content received by the computing system involves at least one remote computing system accessible to the computing system.

17. The computer program product of claim 15, wherein the content of the annotation contains user-defined information.

* * * * *